United States Patent [19]

Clay

[11] Patent Number: 4,869,946
[45] Date of Patent: Sep. 26, 1989

[54] TAMPERPROOF SECURITY CARD

[75] Inventor: Stanton T. Clay, Alpharetta, Ga.

[73] Assignee: Nimslo Corporation, Doraville, Ga.

[21] Appl. No.: 139,191

[22] Filed: Dec. 29, 1987

[51] Int. Cl.⁴ .................... B32B 3/28; B65D 73/00; B42D 15/00

[52] U.S. Cl. ...................... 428/167; 428/40; 428/195; 428/209; 428/210; 428/411.1; 428/915; 428/916; 206/459; 206/807; 283/72; 283/77; 283/112; 40/454

[58] Field of Search .............. 206/459, 807; 283/72, 283/77, 112; 428/40, 210, 195, 209, 915, 411.1, 916, 167; 40/454

[56] References Cited

U.S. PATENT DOCUMENTS

| | | |
|---|---|---|
| 2,815,310 | 12/1957 | Anderson . |
| 3,154,872 | 11/1964 | Nordgren ........................ 428/916 |
| 3,225,457 | 12/1965 | Schure . |
| 3,814,904 | 6/1974 | Russell et al. . |
| 3,819,911 | 6/1974 | Greenaway . |
| 3,892,473 | 7/1975 | Ando et al. . |
| 3,953,869 | 4/1976 | Wah Lo et al. . |
| 3,996,570 | 12/1976 | Roberts . |
| 4,204,638 | 5/1980 | Laude . |
| 4,219,599 | 8/1980 | Idelson et al. ........................ 283/77 |
| 4,229,023 | 10/1980 | Luz ........................ 283/77 |
| 4,245,035 | 1/1981 | Poshkus ........................ 283/112 |
| 4,317,626 | 3/1982 | Poshkus ........................ 283/109 |
| 4,329,575 | 5/1982 | Roach . |
| 4,341,952 | 7/1982 | John et al. . |
| 4,389,472 | 6/1983 | Nochaw et al. ........................ 283/72 |
| 4,402,150 | 9/1983 | Sullivan ........................ 40/615 |
| 4,432,071 | 2/1984 | Szabo . |
| 4,433,437 | 2/1984 | Fantone . |
| 4,475,661 | 10/1984 | Griffin ........................ 206/459 |
| 4,625,101 | 11/1986 | Hinks et al. . |
| 4,641,017 | 2/1987 | Lopata . |
| 4,677,285 | 6/1987 | Taniguchi . |
| 4,714,656 | 12/1987 | Bradshaw et al. ........................ 428/411.1 |

FOREIGN PATENT DOCUMENTS

| | | |
|---|---|---|
| 0031525 | 7/1981 | European Pat. Off. . |
| 8300766 | 3/1983 | European Pat. Off. . |
| 3232428 | 3/1984 | Fed. Rep. of Germany . |
| 2108428 | 5/1983 | United Kingdom . |

Primary Examiner—Ellis P. Robinson
Assistant Examiner—P. J. Ryan
Attorney, Agent, or Firm—Brumbaugh, Graves, Donohue & Raymond

[57] ABSTRACT

There is disclosed a unique tamperproof security card comprised of a transparent upper layer having narrow parallel lenses on the outer surface, and an image containing substrate, said two layers forming a lenticular system by which images on the substrate are selectively visible depending upon the angle from which the card is viewed. By incorporating into a selectively visible image the information necessary to verify the identify of the cardholder, e.g. the cardholder's photograph or signature, the card may be rendered substantially tamperproof.

7 Claims, 2 Drawing Sheets

TAMPERPROOF SECURITY CARD

BACKGROUND OF THE INVENTION

The present invention relates to a security card, such as a credit card or identification card. A principal objective of a security card is that it cannot be easily modified or reproduced, and in particular that it cannot be modified or reproduced in such a way that the modification or reproduction, even if not perfect, is usable in place of the original. For example, if a fake credit card is sufficiently authentic-looking as to be accepted by a store clerk, it matters little that a skilled person can distinguish it from the genuine article.

In the past, distinctive graphics and embossings, as well as magnetic characters, were used on cards for security and verification purposes. These means, however, have posed little problem for the unscrupulous, with the result that millions of dollars are lost annually due to fraudulent card use. Even the relatively recent use of a small holograph on the card has not solved the problem.

Another known class of security-type cards employs a machine readable code. These cards contain predetermined optical refractors, which result in a positive identification when the card is inserted into the corresponding machine-reading apparatus. While systems such as these are perhaps more secure than the conventional credit-type card, they are prohibitively expensive and complex and require that the card be used with a reading apparatus specifically tailored to its coding system, thus reducing flexibility. In addition, the stored data is machine-readable only, which further limits the system's utility.

The present invention seeks to overcome these shortcomings by providing a simple, inexpensive and tamperproof card which is readable by both human and machine means. Moreover, the present invention provides a security card which is virtually incapable of being reproduced or modified in any reasonably acceptable manner.

SUMMARY OF THE INVENTION

The present invention utilizes what is known as a lenticular system in card form. A lenticular system employs the unique angular selectiveness of tiny parallel lenses, i.e. lenticules, molded or embossed on an otherwise flat transparent sheet. As the sheet is rotated about an axis parallel to the lenses, successive narrow bands on the underlying substrate, which bands are parallel to and precisely located under respective lenses, become visible. Due to the very small width of the lenses, and the even narrower image bands on the substrate (i.e. there may be a hundred or more adjacent parallel lenses per inch of sheet width, and typically from two to eight image bands under each lens), the bands are perceived as a single complete image. Slight rotation of the sheet about a lens-parallel axis yields an entirely different image as a different band under each lens becomes visible.

Lenticular lens systems are known and have been used in widely disparate and unrelated applications, as indicated and described in the following patents: U.S. Pat. No. 2,815,310, U.S. Pat. No. 3,225,457, U.S. Pat. No. 3,953,869 and U.S. Pat. No. 3,996,570. The disclosures of these patents, insofar as they relate to the structure and operation of lenticular systems, are incorporated herein by reference.

According to the present invention, while separately visible images can each be made to contain a wide variety of information, it is preferred that at least one of these images contain information capable of verifying the validity and legitimate use of the card. For example, one angle of view, i.e. one set of respective bands under the lenses, may show an image of the cardholder's facial photograph, while another angle may show the cardholder's signature. Therefore, unlike existing cards which may include distinctive graphics or even a holograph identifying the issuer of the card, it is preferred in accordance with the present invention that the lenticular lens system incorporate and selectively display information normally necessary for the verification of the identity of the individual card user. If the store clerk or restaurant manager is required to turn the card to the proper angle in order to see the necessary information, e.g. to compare the signature on the store bill with the signature on the card, he or she will be reasonably assured that the card is genuine.

It is also contemplated that an additional image such as a standard bar code optionally be added to the card such that the additional image can be read at any angle and be machine readable. Such an image can be generated by laying down onto the substrate, by photographic or other means, a continuous image the visibility of which is unaffected by the lenticular system, as opposed to a lenticular-compatible image comprised of discrete bands. The present security card also allows for provision on the back of the card of a magnetic strip as used in current card reading systems.

Specific security-related applications include, but are not limited to, security cards, credit cards, driver's licenses, identification cards, passports, etc.

DETAILED DESCRIPTION OF A REPRESENTATIVE EMBODIMENT

Figure 1:
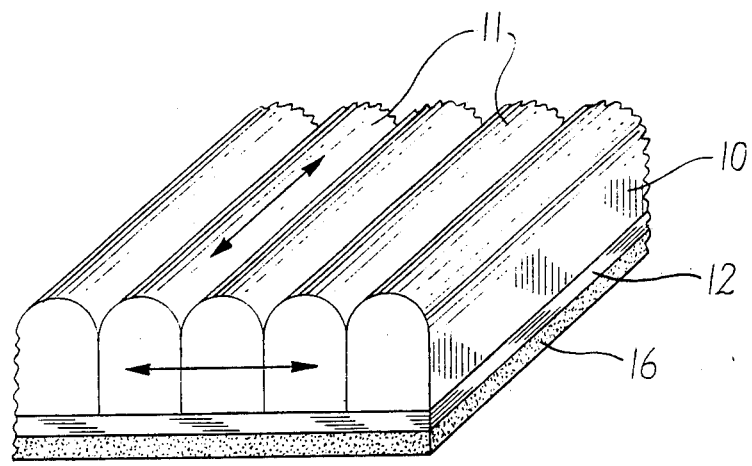
FIG. 1 is an enlarged partial perspective view of a security card in accordance with the invention, showing for illustrative purposes individual lenticules of the transparent lenticular layer.

The basic configuration of the security card according to the present invention may be seen with reference to FIG. 1. As depicted therein, there is a top transparent lenticular layer 10 made up of individual parallel convex lenses or lenticules 11. These lenses are formed on the outer surface of the layer in a known manner, such as by molding or embossing.

Under the transparent layer 11 is an image-containing substrate layer 12. The image on this layer may be either continuous, in which case it is visible from all angles of view, or in the form of precisely located bands under and parallel to the lenticules, in which case separate images are visible depending upon the angle of view. It will be appreciated that the angles of view which are significant to a lenticular system are angles about an axis substantially parallel to the lenticules. Moreover, it will be understood that the various angles of view from which images are selectively visible may not be precise angles; rather they are continuous ranges of angles which may be relatively broad or narrow depending upon the number of strips under each lenticule.

Figure 2:
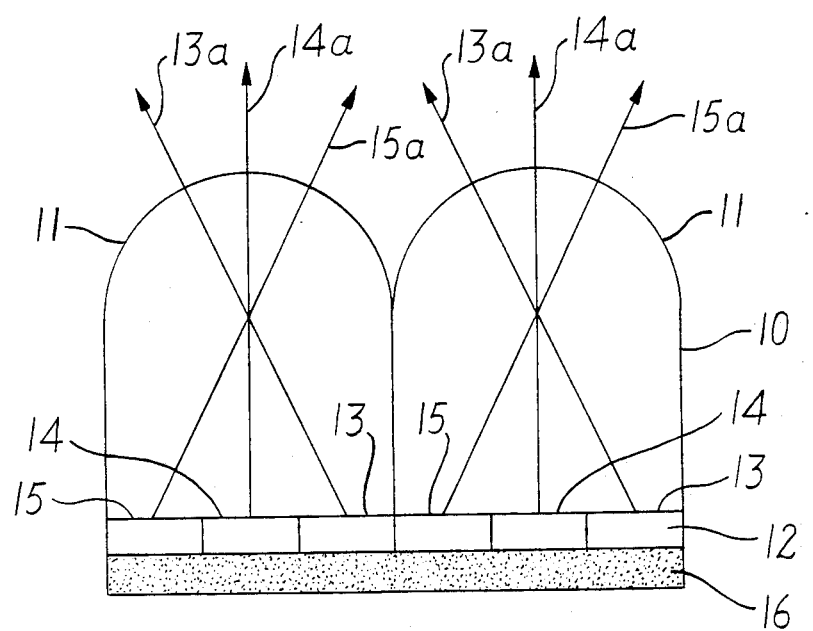
FIG. 2 is an enlarged partial cross-sectional view of the security card of FIG. 1, showing the image structure beneath each of two lenticules.

Looking to FIG. 2, the image strips 13, 14, 15 on the substrate layer are intended to form separately visible images when viewed from angles 13a, 14a and 15a, respectively. The image on the image-containing substrate layer, including the precisely located strips, is typically formed by photographic means, the image being laid down onto a photographic emulsion by means of a lenticular system. Again, the method of providing the image is known and need not be described here. These known methods permit the cards to be easily and separately imaged with the individual data unique to each respective cardholder, e.g. facial photograph, signature, fingerprint, or account number.

The image-containing substrate layer is covered with a white reflective coating and/or backed with a plastic laminate 16, which may contain on its outer surface a magnetic strip (not shown) such as is found on virtually all conventional machine-readable cards.

As pointed out above, a basic attribute of a security card is that it be tamperproof and resistant to fraudulent duplication and use. Therefore, it is preferred that at least one of the images selectively visible by means of the lenticular system contain data which is unique to the individual assigned to the card, and which is capable of verifying the identity of the cardholder. This data would normally include at least the cardholder's signature or photograph, and depending upon the application could also include fingerprint data or the like. The important factor is that the person accepting the card be forced to utilize the lenticular system in order to carry out the verification process. In this regard, once the card format and structure become familiar to persons whose job it is to verify the card, either on a relatively small scale such as a corporate security system, or on a large scale such as a nationwide credit card, authenticity will be readily determined by the presence or absence of the lenticular system itself, and the selective visibility of the data required for verification.

Thus, even if a potential fraudulent user were able to make a relatively authentic-looking card, unless the relevant verifying data such as signature or photograph could be made to appear and disappear by simply turning the card, the card would be instantly recognizable as fraudulent. Similarly, it would be virtually impossible for an authentic card to be tampered with so as to selectively display data not originally laid onto the image-containing layer, and any attempt to do so should be readily apparent.

Figure 3:
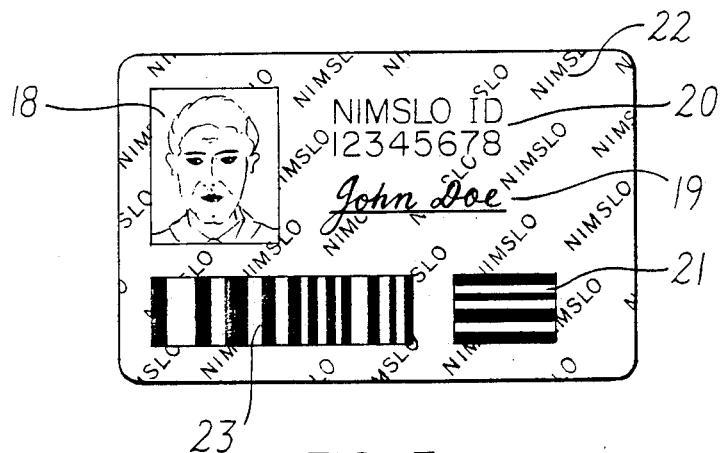
FIG. 3 is a front view of the security card demonstratively showing a plurality of encoded discrete images simultaneously.
Figure 4:
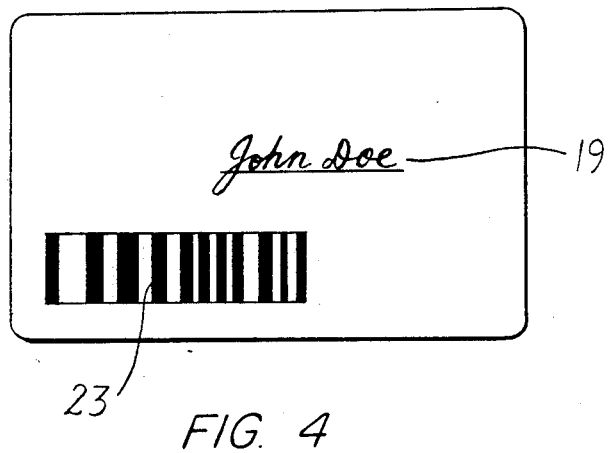
FIGS. 4 and 5 are frontal views of the security card viewed at varying angles and showing both selectively and constantly visible images.
Figure 5:
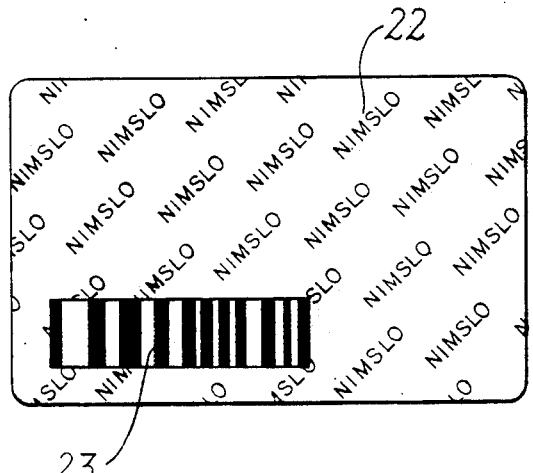

The security-related advantages of the present security card can be appreciated with reference to FIGS. 3-5. FIG. 3 is an intentionally non-preferred embodiment wherein a plurality of images are visible simultaneously, e.g. photograph 18, signature 19, account number 20, verification code 21, and card issuer logo 22. In the preferred embodiment, at least one of these images, and preferably more than one, will be visible only at a certain angle or angles. FIG. 3 is, therefore, intended primarily to show the different types of data that can be put on the card.

FIG. 3 also shows a bar code 23 which can be laid down as a continuous image on the substrate rather than as a series of narrow strips which are part of the lenticular system. Such an image is visible at all angles, whether the card is turned about its optically active (parallel to the lenticules) or optically inactive (perpendicular to the lenticules) axis. The presence of this bar code permits human or machine readability by conventional means. Thus it will be appreciated that the invention may utilize both the active and inactive features of the lenticular system.

It is a further unique feature of the security card according to the invention that both selectively visible and constantly visible data can be provided on the substrate without adding to the cost of the card.

Other constantly visible images (e.g. logos, card descriptions, etc.) may be placed at desired locations so as to be visible from all angles, so long as they do not significantly interfere with the selectively visible images.

FIG. 4 shows an embodiment viewed from an angle from which only the signature and the bar code are visible. FIG. 5 shows the same card viewed at a different angle whereby only the logo and the bar code are visible. Assuming that the signature or photograph of the cardholder is necessary for verification and acceptance, business establishment personnel would be forced to actively use the lenticular system and would be instantly alerted if the signature or photograph were constantly visable as the card was turned. Indeed, it is to be expected that the unique format and structure of the card will lead such personnel to take a more active role, and hence a greater interest, in the verification process.

Not shown in the drawings is the conventional magnetic strip which may be attached to any portion of the card, typically the back surface. This further demonstrates the unique capability of the present invention to provide an economical, tamperproof and easily verifiable security card which at the same time may incorporate conventional data-containing and recognition means.

While it is possible, and sometimes preferable, that the multiple selectively visible images be superimposed (i.e. be visible from different angles on the same portion of the card), this is not absolutely necessary. Thus the respective different locations of the facial photograph and signature in FIG. 3 are merely exemplary, since the two images could just as easily be located in substantially the same portion of the face of the card. Indeed by employing overlapping but separately visable images, the unique nature of the card, and in particular its tamperproof selective visibility feature, is more readily apparent to both card users and card-accepting establishments. Similarly, overlapping images are rendered even more tamperproof since a different photograph or signature cannot be superimposed on the images without obliterating the dual image feature.

I claim:

1. A security card comprising an image-containing substrate layer and a transparent layer overlaying said substrate, said transparent layer having a plurality of parallel uniformly-spaced lenticules on the outer surface therof, and said image-containing layer having discrete data-containing bands under and parallel to a plurality of the lenticules of the lenticular layer, said lenticules and said bands positioned with respect to one another such that they function as a lenticular system wherein said discrete bands are selectively visible and not visible as at least one data-containing image when the card is viewed from different angles about an axis of rotation parallel to said lenticules, said at least one data-containing image containing information which distinguishes said card from otherwise similar cards and which is unique to a particular person assigned to said card.

2. A security card according to claim 1 wherein said image depicts at least one of said person's face, fingerprint or signature.

3. A security card according to claim 1 wherein said discrete bands are positioned such that a plurality of images are each selectively visible from a respective different angle of view about said axis.

4. A security card according to claim 3 wherein a plurality of said images are each visible from only one angle of view, said angle of view being different than the angle at which each other of said plurality of images is visible.

5. A security card according to claim 4 wherein an image depicting a person's face is visible from an angle of view from which an image depicting said person's signature is not visible, and an image depicting said person's signature is visible from a different angle of view from which said image depicting said person's face is not visible.

6. A security card according to claim 1 wherein said image-containing layer also contains an additional data-containing image which is visible irrespective of the angle of view.

7. A security card according to claim 6 wherein said additional data-containing image is a bar code.

* * * * *

REEXAMINATION CERTIFICATE (1587th)
United States Patent [19]
Clay

[11] B1 4,869,946
[45] Certificate Issued Nov. 5, 1991

[54] TAMPERPROOF SECURITY CARD

[75] Inventor: Stanton T. Clay, Alpharetta, Ga.

[73] Assignee: Nimslo Corporation

Reexamination Request:
No. 90/002,178, Oct. 24, 1990

Reexamination Certificate for:
Patent No.: 4,869,946
Issued: Sep. 26, 1989
Appl. No.: 139,191
Filed: Dec. 29, 1987

[51] Int. Cl.⁵ .............................................. B32B 9/00
[52] U.S. Cl. ...................................... 428/167; 428/30; 428/40; 428/195; 428/209; 428/210; 428/411.1; 428/915; 428/916; 40/454; 206/459; 206/807; 283/72; 283/77; 283/112
[58] Field of Search ................... 428/167, 195, 411.1, 428/915, 916; 283/70, 72, 77, 91; 206/459, 807; 40/459

[56] References Cited
U.S. PATENT DOCUMENTS
4,417,784 11/1983 Knop et al.
4,765,656 8/1988 Becker et al.

FOREIGN PATENT DOCUMENTS
0216947 4/1987 European Pat. Off.
0219012 4/1987 European Pat. Off.
2456625 12/1980 France.
2067467 7/1981 United Kingdom.

*Primary Examiner*—P. J. Ryan

[57] ABSTRACT

There is disclosed a unique tamperproof security card comprised of a transparent upper layer having narrow parallel lenses on the outer surface, and an image containing substrate, said two layers forming a lenticular system by which images on the substrate are selectively visible depending upon the angle from which the card is viewed. By incorporating into a selectively visible image the information necessary to verify the identify of the cardholder, e.g. the cardholder's photograph or signature, the card may be rendered substantially tamperproof.

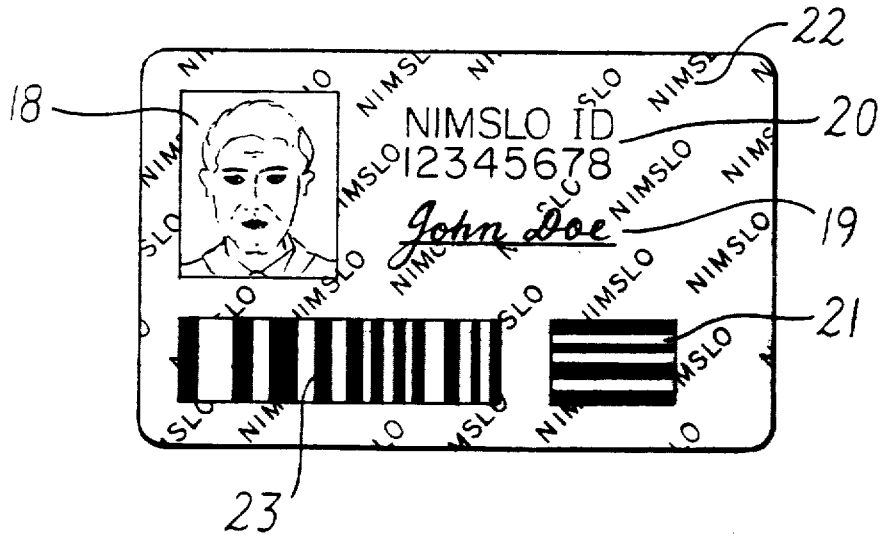

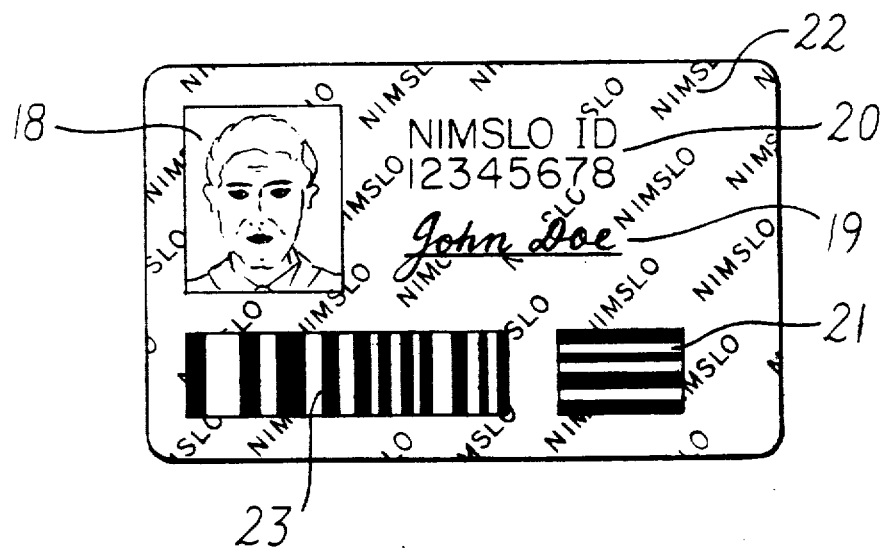

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 1 is determined to be patentable as amended.

Claims 2-7, dependent on an amended claim, are determined to be patentable.

1. A security card comprising an image-containing substrate layer and a transparent layer overlaying said substrate, said transparent layer having a plurality of parallel uniformly-spaced lenticules on the outer surface thereof, and said image-containing layer *comprising a photographic emulsion affixed to the inner surface of said transparent layer and* having *photographically recorded thereon through the overlying lenticules* discrete data-containing bands under and parellel to a plurality of the lenticules of the lenticular layer, said lenticules and said bands positioned with respect to one another such that they function as a lenticular system wherein said discrete bands are selectively visible and not visible as at least one data-containing image when the card is viewed from different angles about an axis of rotation parallel to said lenticules, said at least one data-containing image containing information which distinguishes said card from otherwise similar cards and which is unique to a particular person assigned to said card.

* * * * *